(12) United States Patent
Hirooka

(10) Patent No.: US 7,474,503 B2
(45) Date of Patent: Jan. 6, 2009

(54) THIN FILM MAGNETIC HEAD WAFER WITH IDENTIFICATION INFORMATION

(75) Inventor: Taisuke Hirooka, Kobe (JP)

(73) Assignee: Hitachi Metals, Ltd., Tokyo (JP)

( * ) Notice: Subject to any disclaimer, the term of this patent is extended or adjusted under 35 U.S.C. 154(b) by 169 days.

(21) Appl. No.: 11/466,475

(22) Filed: Aug. 23, 2006

(65) Prior Publication Data

US 2006/0279879 A1    Dec. 14, 2006

Related U.S. Application Data

(62) Division of application No. 10/460,371, filed on Jun. 13, 2003, now Pat. No. 7,114,239.

(30) Foreign Application Priority Data

Oct. 4, 2002    (JP)    ............... 2002-291971

(51) Int. Cl.
  *G11B 5/147*    (2006.01)
  *G11B 5/127*    (2006.01)
  *H04R 31/00*    (2006.01)

(52) U.S. Cl. ............... 360/126; 29/603.07; 29/603.12; 360/234.1; 360/234.2; 360/234.3; 427/127; 427/128; 451/5; 451/41

(58) Field of Classification Search ............... 360/324, 360/324.3; 29/603.07, 603.12, 603.15; 216/65; 427/127–128; 451/5, 41
  See application file for complete search history.

(56) References Cited

U.S. PATENT DOCUMENTS

| | | | |
|---|---|---|---|
| 4,166,574 A | 9/1979 | Yokoyama | |
| 5,294,812 A | 3/1994 | Hashimoto et al. | |
| 5,329,090 A * | 7/1994 | Woelki et al. | ......... 219/121.68 |
| 5,516,430 A | 5/1996 | Hussinger | |
| 5,694,677 A * | 12/1997 | Tsunoda | ............ 29/603.12 |
| 5,721,651 A | 2/1998 | Kitahara | |
| 5,764,454 A | 6/1998 | Hishida | |
| 5,837,963 A | 11/1998 | Kitahara | |
| 5,984,190 A | 11/1999 | Nevill | |
| 6,202,289 B1 | 3/2001 | Yoshimura et al. | |
| 6,313,436 B1 | 11/2001 | Harrison | |
| 6,344,892 B1 | 2/2002 | Sugita et al. | |
| 6,449,123 B1 | 9/2002 | Tsujimoto et al. | |
| 6,532,132 B2 * | 3/2003 | Tsujimoto et al. | .......... 360/126 |
| 6,721,443 B1 * | 4/2004 | Nakata | .............. 382/141 |
| 6,731,373 B2 * | 5/2004 | Shoji | ............... 355/53 |

(Continued)

FOREIGN PATENT DOCUMENTS

JP    62-020116 A    1/1987

(Continued)

OTHER PUBLICATIONS

English Machine Translation of JP 2001-210573 (reference already noted on IDS by applicant).*

*Primary Examiner*—Angel Castro
*Assistant Examiner*—Christopher R. Magee
(74) *Attorney, Agent, or Firm*—Keating & Bennett, LLP

(57) ABSTRACT

A thin-film magnetic head wafer includes a first principal surface and a second principal surface which are substantially parallel to each other. An electrical/magnetic transducer is provided on the first principal surface. Identification information is recorded on the first principal surface of the wafer.

13 Claims, 5 Drawing Sheets

U.S. PATENT DOCUMENTS

| | | | |
|---|---|---|---|
| 6,897,010 B2 * | 5/2005 | Hirooka | 430/323 |
| 6,906,895 B2 * | 6/2005 | Hirooka | 360/234.3 |
| 6,924,090 B2 * | 8/2005 | Hirooka | 430/394 |
| 7,103,948 B1 * | 9/2006 | Hartmann et al. | 29/25.35 |

FOREIGN PATENT DOCUMENTS

| | | |
|---|---|---|
| JP | 03-295219 A | 12/1991 |
| JP | 05-182132 A | 7/1993 |
| JP | 09-050606 A | 2/1997 |
| JP | 09-081922 A | 3/1997 |
| JP | 09-223755 A | 8/1997 |
| JP | 10-134317 A | 5/1998 |
| JP | 11-126311 A | 5/1999 |
| JP | 11-307449 A | 11/1999 |
| JP | 2001-210573 A | 8/2001 |

* cited by examiner

THIN FILM MAGNETIC HEAD WAFER WITH IDENTIFICATION INFORMATION

This application is a Divisional Application of U.S. patent application Ser. No. 10/460,371 filed Jun. 13, 2003, currently pending.

BACKGROUND OF THE INVENTION

1. Field of the Invention

The present invention relates to a thin-film magnetic head wafer on which ID information is recorded and a method for manufacturing such a wafer. The present invention also relates to a magnetic head obtained by providing various types of transducers on the thin-film magnetic head wafer and further relates to a record medium drive including such a magnetic head.

2. Description of the Related Art

Recently, a thin-film magnetic head having any of various structures often includes a magnetic head slider for use in a hard disk drive (HDD), a tape storage and a flexible (or floppy) disk drive (FDD), for example. Examples of wafers for such a thin-film magnetic head include sintered wafers having compositions such as $Al_2O_3$—TiC, SiC and $ZrO_2$.

FIG. 1A illustrates a typical thin-film magnetic head slider 10. On its tracking side, this magnetic head slider 10 includes two side rails 11 that are arranged to be opposed to the surface of a magnetic disk. The surface of the thin-film magnetic head slider 10 on which the side rails 11 are provided is sometimes called an "air bearing surface (ABS)". If the magnetic disk is rotated at a high velocity by a motor, for example, while the surface of the magnetic disk is pressed lightly by the side rails 11 of the magnetic head slider 10 by way of a head suspension, then an air layer will be formed on the surface of the magnetic disk and will reach the back surface of the air bearing surface of the slider 10. As a result, the magnetic head slider 10 is slightly lifted up. In this manner, the magnetic head slider 10 can perform read and write operations on the magnetic disk while "flying" near the surface of the disk so to speak.

A thin film 12, which causes a magnetic interaction with a recording medium such as a magnetic disk, is deposited on one end surface of the magnetic head slider 10. The thin film 12 is used to form part of an electrical/magnetic transducer. To indicate the type of the product, an identifier (ID or ID mark) 13 such as a serial number is inscribed on the other end surface of the magnetic head slider 10. Methods of inscribing an identifier 13 on sintered wafers are disclosed in Japanese Laid-Open Publications Nos. 9-81922, 10-134317 and 11-126311, for example.

While the magnetic head slider 10 is flying with the rotation of a recording medium such as a magnetic disk, the magnetic head slider 10 leans such that the end surface thereof with the thin film 12 deposited thereon is closest to the recording medium and such that the other end surface thereof with the identifier 13 recorded thereon is farthest from the recording medium. The gas flows along the air bearing surface (ABS) from the end surface with the identifier 13 recorded thereon (i.e., leading edge) to the end surface with the thin film 12 deposited thereon (i.e., trailing edge).

In a typical manufacturing process, the magnetic head slider 10 is obtained by cutting out a bar 20 shown in FIG. 1B from a sintered wafer 1 shown in FIG. 1C and then dicing the bar 20 into a great number of chips. The sintered wafer 1 includes a first principal surface (on the leading edge) and a second principal surface (on the trailing edge), which are parallel to each other. The first principal surface will be referred to herein as the "front surface" of the wafer while the second principal surface will be referred to herein as the "back surface" of the wafer for convenience sake.

In FIG. 1C, the end surface 4 of the sintered wafer 1 is parallel to the air bearing surface of the magnetic head slider 10 shown in FIG. 1A.

Recently, as the sizes of such a thin-film magnetic head have been decreased to reduce the sizes and weight of an electronic appliance, the thickness of the sintered wafer 1 (corresponding to the length L of the magnetic head slider 10) and the thickness T of each bar 20 (corresponding to the height of the magnetic head slider 10) have also been reduced. For example, a magnetic head slider, which is called a "pico-slider", has a length L of about 1.2 mm and a thickness T of about 0.3 mm. For magnetic head sliders of such drastically reduced sizes, the sizes of characters to be inscribed on the slider should also be reduced correspondingly.

In the prior art, a laser marking method is often used to inscribe the identifier 13. In the laser marking method, the identifiers 13 shown in FIGS. 1A and 1B are written on the back surface 3 of the wafer 1 that is yet to be divided into the bars 20. After the ID marking process step is finished, various thin films 12 (such as insulating films and magnetic films) are stacked on the front surface 2 of the wafer 1.

Hereinafter, the conventional laser marking method will be described briefly with reference to FIG. 2.

In the laser marking method, the back surface 3 of the sintered wafer 1 is locally irradiated with a laser beam 6 that has been converged by a lens 5, thereby rapidly heating and vaporizing the irradiated portion of the wafer 1. In this case, a tiny concave portion is formed on the back surface 3 of the wafer 1, while the material of the sintered wafer 1 is scattered around and just a portion of the scattered material is deposited on the wafer 1 again. By scanning the back surface 3 of the wafer 1 with the laser beam 6, the concave portions can be arranged so as to form an arbitrary pattern on the back surface 3 (which will be referred to herein as a "concave pattern"). Any of various types of identifiers 13 can be written at an arbitrary location on the wafer 1 by forming a concave pattern, which is made up of alphanumeric and/or numeric characters or a barcode, on the back surface 3 of the wafer 1.

FIG. 3 schematically illustrates a cross section of a sintered wafer 1 that has been marked by the conventional laser marking method. This cross-sectional view is drawn after a scanning electron microscope (SEM) photograph has actually been taken. As shown in FIG. 3, a deep concave portion 30 is formed on the surface of the wafer 1 as a result of the laser beam exposure. As measured from the back surface of the wafer 1 in the direction indicated by the arrow a in FIG. 3, the concave portion 30 has a depth of about 30 μm to about 50 μm. A convex portion (or burr) 31 is also formed around the edge of the concave portion. As also measured from the back surface of the wafer 1 in the direction indicated by the arrow b, the burr 31 has a height of several μm. The concave portion may have a width of about 20 μm, for example.

In the conventional laser marking process, however, the portion of the sintered material that has been scattered around as a result of the exposure to the laser beam is likely adsorbed or deposited as dust onto the inscribed characters, thus causing a contamination problem in many cases.

As shown in FIG. 3, a huge number of particles 32 are deposited on the inner surface of the deep concave portion 30 that has been formed as a result of the laser beam exposure. Strictly speaking, some of those "particles" 32 may have irregular shapes that cannot be classified among "particles". However, those with irregular shapes will also be referred to herein as "particles" for the sake of simplicity. To remove those particles 32 from the wafer 1, a cleaning process such as an ultrasonic cleaning process must be carried out for a long time after the marking process is finished. Even so, it has still been difficult to remove most of the particles 32 that have reached the depth of the concave portion 30.

If a huge number of particles 32 are created during the marking process, some of those particles may be dispersed in the cleaning liquid and then deposited on the other side (i.e., the front surface 2) of the wafer 1 that has not been exposed to the laser beam. In that case, when an insulating thin film of alumina, for example, is deposited on the front surface 2 of the wafer 1 with the re-deposited particles 32, then those particles 32 might be introduced into the insulating film. Also, the surface of such an insulating thin film is normally planarized before a magnetic thin film is deposited thereon. Accordingly, if the insulating thin film includes the particles 32, portions of the insulating thin film may peel off locally along with the particles 32 to possibly create pinholes in the insulating thin film during the planarizing process. Also, even if no such pinholes have been created, a portion of the insulating thin film may have its thickness decreased significantly by the particles 32. Then, that portion of the insulating thin film may exhibit decreased insulating properties. Furthermore, even when no such particles enter the insulating film, the marks on the back surface of the wafer 1 may still be a dust source. Then, the yield may decrease in a number of subsequent manufacturing process steps, and the quality of the final product itself may deteriorate.

Also, as the storage capacity of HDDs has been further increased recently, the distance between the magnetic head and the recording medium (i.e., magnetic disk) during a read or write operation has been further decreased. Thus, the presence of even a very small amount of particles may cause a serious error in the operation of an HDD. Accordingly, if the concave portion formed on the back surface of a wafer to record ID information thereon traps dust, then the concave portion may be a dust source during the read or write operation. In that case, the reliability of a recording medium drive such as an HDD may deteriorate significantly.

SUMMARY OF THE INVENTION

In order to overcome the problems described above, preferred embodiments of the present invention provide a thin-film magnetic head wafer, of which a portion representing ID information recorded never becomes a dust source, and a method for manufacturing such a wafer.

A thin-film magnetic head wafer according to a preferred embodiment of the present invention preferably includes a first principal surface and a second principal surface which are substantially parallel to each other. An electrical/magnetic transducer is preferably provided on the first principal surface. In this thin-film magnetic head wafer, identification information is preferably recorded on the first principal surface of the wafer.

In one preferred embodiment of the present invention, the identification information preferably includes information that is unique to the wafer.

In another preferred embodiment, the identification information is preferably recorded on a plurality of areas on the first principal surface of the wafer, and mutually different portions of the identification information are preferably allocated to the respective areas.

In this particular preferred embodiment, the areas are preferably arranged so as to define respective thin-film magnetic heads when the wafer is divided.

In still another preferred embodiment, an alignment mark is preferably formed on the wafer.

In yet another preferred embodiment, the wafer preferably further includes an insulating film that covers the first principal surface of the wafer.

In this particular preferred embodiment, the identification information is preferably recorded on the surface of the wafer and/or in the insulating film.

Specifically, the surface of the insulating film is preferably flat.

More specifically, the insulating film is preferably made of alumina.

In yet another preferred embodiment, the identification information is preferably represented by a pattern of concave portions and/or convex portions that have been arranged on the first principal surface of the wafer.

In yet another preferred embodiment, the identification information is preferably represented by a metal pattern that is provided on the first principal surface of the wafer.

In yet another preferred embodiment, the wafer is preferably made of alumina titanium carbide.

In yet another preferred embodiment, the identification information is preferably recorded in an area of the first principal surface such that light radiated toward the wafer to read the identification information is able to reach the area.

In yet another preferred embodiment, each of the pieces of the information allocated to the respective areas is preferably recorded within a recording region that is included in a substantially rectangular area of about 300 μm square.

In yet another preferred embodiment, the wafer preferably has a thickness of about 400 μm to about 1,200 μm.

According to another preferred embodiment of the present invention, a magnetic head preferably includes a chip substrate, which is obtained by dividing the thin-film magnetic head wafer according to any of the preferred embodiments described above, and an electrical/magnetic transducer provided on the chip substrate.

According to still another preferred embodiment of the present invention, a recording medium drive preferably includes a magnetic head including a chip substrate and an electrical/magnetic transducer, a recording medium with a magnetic recording film, from and on which information is read and written by the magnetic head, and a motor for driving the recording medium. The chip substrate is preferably obtained by dividing the thin-film magnetic head wafer according to any of the preferred embodiments described above. The electrical/magnetic transducer is preferably provided on the chip substrate.

According to yet another preferred embodiment of the present invention, a method for manufacturing a thin-film magnetic head wafer, on which identification information is recorded, preferably includes the step of preparing a ceramic wafer for a thin-film magnetic head. In this process step, the wafer preferably has a first principal surface and a second principal surface that are substantially parallel to each other, and an electrical/magnetic transducer is preferably provided on the first principal surface. The method preferably further includes the steps of recording the identification information on the first principal surface of the wafer and depositing an insulating film on the first principal surface of the wafer so as to cover the identification information recorded thereon.

In one preferred embodiment of the present invention, the step of recording the identification information preferably includes the step of recording the identification information in an area on the first principal surface such that light radiated toward the wafer to read the identification information is able to reach the area.

In another preferred embodiment, the step of recording the identification information preferably includes the steps of forming a mask having a pattern that defines the identification information on the first principal surface and selectively etching away portions of the first principal surface that are not covered by the mask.

In still another preferred embodiment, the method may further include the step of forming a thin film on the first principal surface. In that case, the step of recording the identification information preferably includes the steps of forming a mask having a pattern that defines the identification information on the thin film and selectively etching away portions of the thin film that are not covered with the mask.

In this particular preferred embodiment, the step of forming the mask preferably includes the step of forming a photoresist pattern.

In yet another preferred embodiment, the step of recording the identification information preferably includes the step of forming a metal layer having a pattern that defines the identification information on the first principal surface.

In yet another preferred embodiment, the step of recording the identification information may include the step of forming an alignment mark.

In yet another preferred embodiment, the method may further include the step of planarizing the surface of the insulating film.

In this particular preferred embodiment, the planarizing step preferably includes the step of planarizing the surface of the insulating film to a surface roughness of at most about 2 nm.

In yet another preferred embodiment, the step of depositing the insulating film preferably includes the step of depositing an alumina film.

In yet another preferred embodiment, the method may further include the step of reducing the thickness of the wafer by polishing the second principal surface of the wafer.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1A:
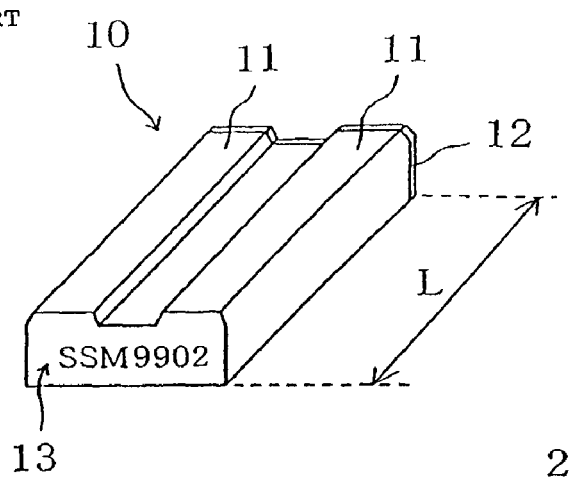
FIG. 1A is a perspective view of a slider for a magnetic head.
Figure 1B:
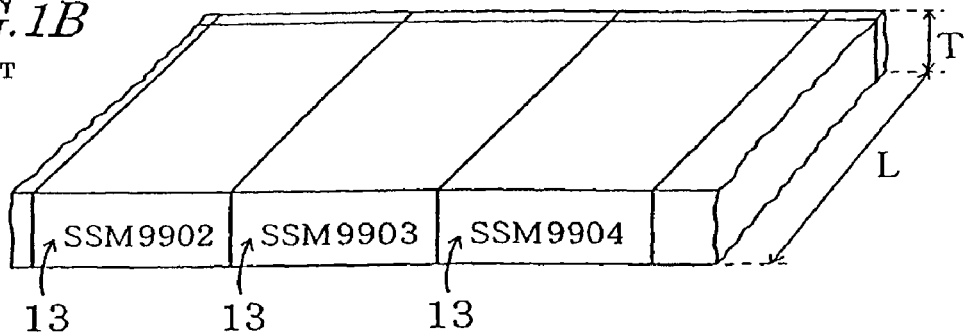
FIG. 1B is a perspective view illustrating a bar yet to be divided into multiple sliders for magnetic heads.
Figure 1C:
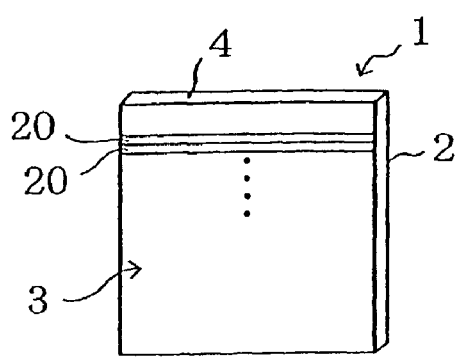
FIG. 1C is a perspective view illustrating a substantially rectangular sintered wafer.
Figure 2:
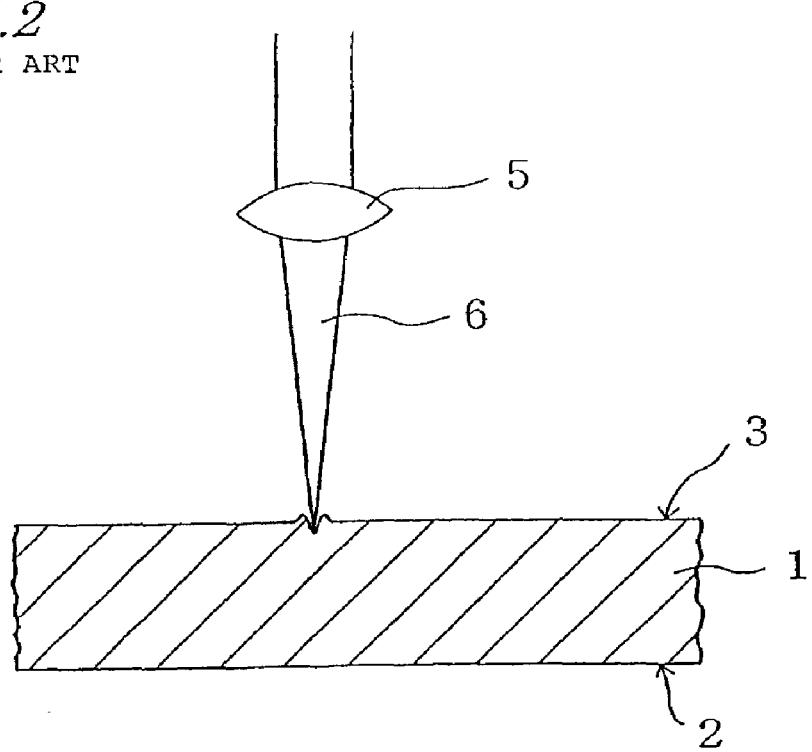
FIG. 2 schematically illustrates a conventional laser marking process.
Figure 3:
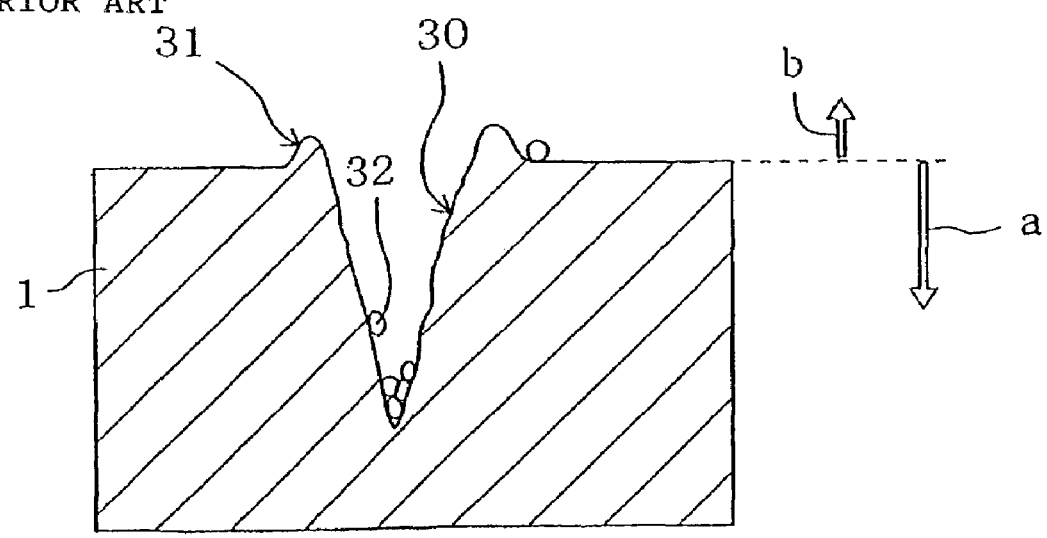
FIG. 3 is a cross-sectional view showing a deeply inscribed portion formed by a conventional laser marking process.

A thin-film magnetic head wafer according to a preferred embodiment of the present invention is characterized in that ID information is recorded on the first principal surface of the wafer, i.e., on the trailing edge on which a patterned magnetic film will be deposited.

In the thin-film magnetic head wafer, an embossed pattern, representing the ID information, is defined on the surface of the wafer, and therefore, no concave portions are formed on the back surface of the wafer and no particles can reach the depth of the wafer through the back surface thereof. Also, before a transducer element for use to read and/or write data from/onto a recording medium is provided on the surface of the wafer, an insulating film (e.g., an alumina film) with a flat surface is deposited on the surface of the wafer. Once the surface of the wafer has been covered with such an insulating film, no particles can enter the embossed pattern representing the ID information, thus increasing the cleanness of the wafer.

In addition, since the embossed pattern representing the ID information is coated with the insulating film, the level differences of the embossed pattern never decrease due to abrasion or etching during the manufacturing process of thin-film magnetic heads. Thus, an unwanted decrease in the readability of the ID information, which is normally unavoidable in a conventional manufacturing process, can also be eliminated.

Furthermore, according to a preferred embodiment of the present invention, even if the thickness of the wafer is reduced by polishing the back surface (i.e., the second principal surface) thereof after an electrical/magnetic transducer or terminal for use to read and/or write data has been formed on the surface of the wafer, the ID information is never lost.

The ID information is preferably recorded at a location that reading light, which is irradiated onto the wafer to read the ID information, can reach (i.e., where no light blocking members such as the electrical/magnetic transducers are located). The ID information may be represented by a pattern with a line width on the order of several µm. Thus, the region to record the ID information thereon may have just a small area. For that reason, a sufficient space can be easily secured to record the ID information thereon even on the surface of the wafer on which a patterned magnetic film or terminal should be provided.

Hereinafter, preferred embodiments of thin-film magnetic head wafers according to the present invention will be described.

In a preferred embodiment of the present invention, the wafer to be marked with ID information is preferably a ceramic wafer obtained by sintering a mixture of at least two types of powder particles that should be etched at mutually different rates under a particular combination of etching conditions. More specifically, a ceramic wafer made of an alumina titanium carbide ($Al_2O_3$—TiC) ceramic, preferably consisting essentially of $Al_2O_3$ and TiC, is preferably used.

A ceramic made up of at least two compounds to be selected from the group consisting of aluminum oxide, aluminum nitride, silicon dioxide, silicon nitride, zirconium oxide, zirconium nitride, silicon carbide, titanium carbide, titanium oxide and iron oxide can be used effectively as such a material for the sintered wafer.

Next, ID information is recorded at an appropriately selected location on the surface of the wafer (i.e., the surface on which a magnetic film will be deposited). The ID information may be represented by an embossed pattern (or concave or convex portions) with a line width of about 2 μm to about 3 μm and is preferably made up of several alphanumeric characters (such as alphabets and numerals). Each of those characters may be inscribed so as to have dimensions of about 24 μm by about 12 μm. Thus, the ID information consisting of those several alphanumeric characters is normally recordable within a substantially rectangular area of about 100 μm square (at most about 300 μm square) although the size of the area is changeable with the intended number of characters to be inscribed thereon. It is easy to secure a substantially rectangular area of such a small size on the unused space on the surface of the wafer.

Figure 4:
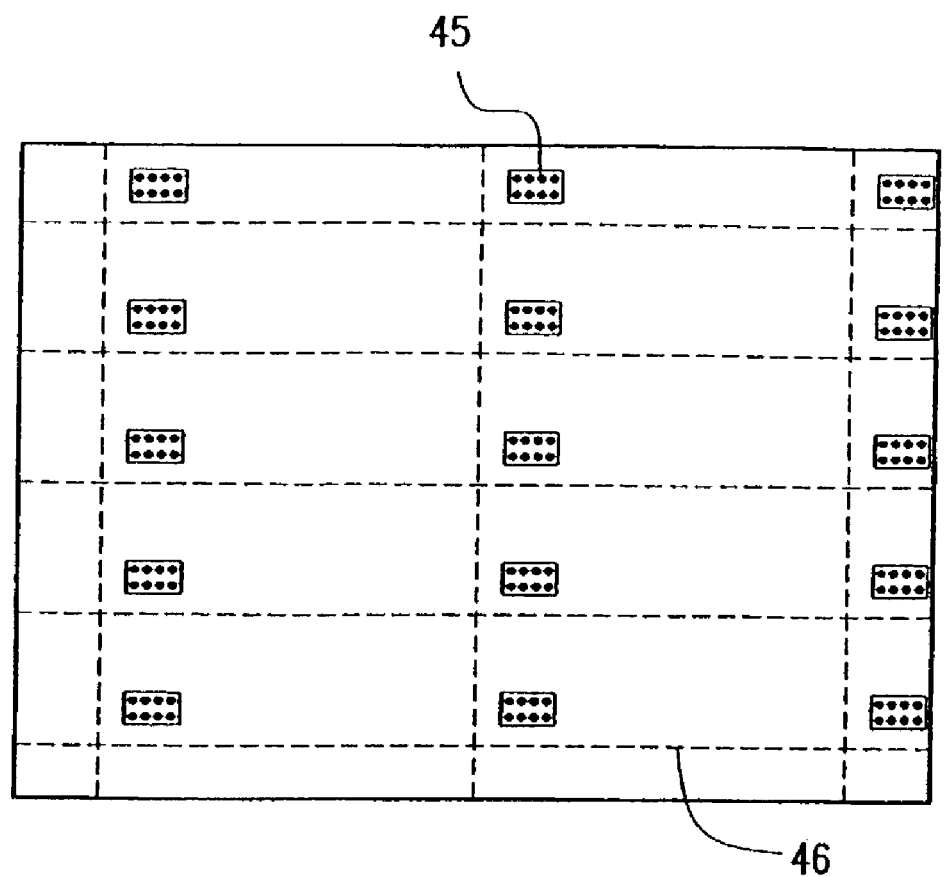
FIG. 4 is a plan view showing a portion of the surface of a wafer.
Figure 5:
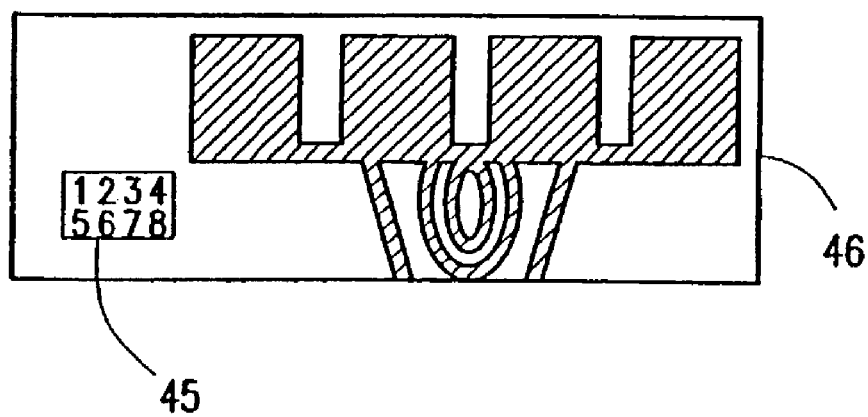
FIG. 5 is a plan view illustrating a single-chip area on the surface of the wafer on a larger scale.

FIG. 4 is a plan view showing a portion of the surface of the wafer. FIG. 5 is a plan view illustrating a single-chip area on the surface of the wafer on a larger scale.

As shown in FIG. 4, the surface of the wafer is divided into multiple areas 46, each corresponding to a single chip substrate for a magnetic head. In FIG. 4, eight areas 46 are illustrated fully. This wafer will be separated along the boundaries between the areas 46 into a number of chip substrates in the end. That is to say, the chip substrate shown in FIG. 5 corresponds to one of the areas 46 shown in FIG. 4. As shown in FIGS. 4 and 5, each of those areas 46 on the wafer includes a substantially rectangular region 45 on which ID information was recorded. In FIG. 5, the hatched region represents a magnetic film and terminals to be included in an electrical/magnetic transducer. Thus, the reading light can be irradiated toward the ID information. It should be noted that even if a portion of the electrical/magnetic transducer or any other element is provided at such a location as to partially overlap with the ID information recorded, there is no problem as long as the element can transmit the reading light.

Hereinafter, a preferred embodiment of a method of making magnetic head wafers according to the present invention will be described with reference to FIGS. 6A through 6D.

Figure 6A:
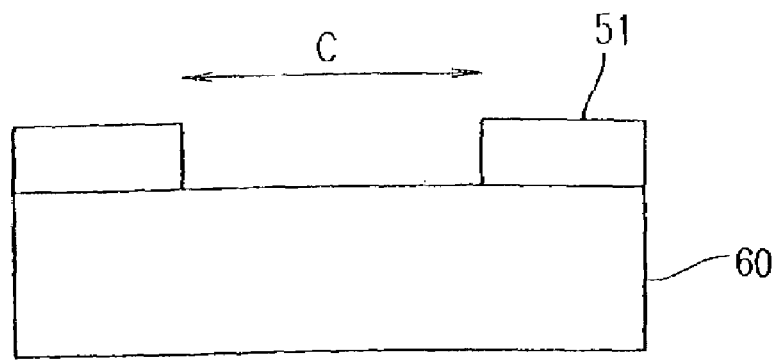
FIGS. 6A, 6B and 6C are cross-sectional views showing respective etching process steps to record ID information on a ceramic wafer.

First, as shown in FIG. 6A, a masking layer 51, having a pattern that defines the ID information, is formed on the surface of a ceramic wafer 60. The masking layer 51 is preferably made of a material that exhibits sufficient resistivity against the subsequent etching process. When the masking layer 51 is made of a positive photoresist, for example, the positive photoresist may be applied to a thickness of about 1 μm to about 2 μm on the principal surface of the sintered wafer 60 with a spinner, for example, and then baked. As such a photoresist material, OFPR-800 produced by Tokyo Ohka Kogyo may be used, for example.

Next, after the photoresist has been baked, the photoresist is exposed to a g-line ray at an intensity of about 200 mJ/cm$^2$ by way of a photomask or a "Titler" marker that defines an ID information pattern. This process step will be referred to herein as an "exposure process step".

When the exposure process step is finished, a development process step is carried out, thereby obtaining a masking layer 51, having an opening (with a width C) that defines a pattern corresponding to the ID information pattern, on the sintered wafer 60.

Subsequently, the sintered wafer 60 covered with the masking layer 51 is loaded into an etching process chamber (not shown) of a reactive ion etching (RIE) system, thereby subjecting the wafer 60 to a predetermined etching process. The etching gases for use in this etching process may be appropriately selected according to the specific material to be etched. In this preferred embodiment, the $Al_2O_3$—TiC ceramic wafer is preferably used as described above. Thus, $CF_4$ gas or $SF_6$ gas is preferably used, for example. When $CF_4$ gas is used, the electrical discharge of the $CF_4$ gas generates radical species and ions. A chemical etching process to which F contributes has a selectivity so as to etch TiC earlier and faster than $Al_2O_3$. In this preferred embodiment, the selective etching process is preferably carried out under such conditions that the etch rate of TiC becomes several times as high as the etch rate of $Al_2O_3$.

On the other hand, a physical etching process, to which ions generated by the electrical discharge contribute, has no such selectivity, thus etching $Al_2O_3$ and TiC at almost equal rates. It should be noted that the etch rate of $Al_2O_3$ may be slightly higher than that of TiC depending on the conditions.

In this manner, in the RIE system, the ion-induced physical etching action competes with the radical-species-induced chemical etching action. Thus, by controlling the gas pressure and the voltage applied to the electrode, the RIE system can readily switch the selective etching process and the non-selective etching process. Specifically, when the gas pressure is set relatively high and the voltage relatively low, the radical species density exceeds the ion density, thus accelerating the selective etching process. Conversely, when the gas pressure is set relatively low and the voltage relatively high, the ion density exceeds the radical species density, thus accelerating the non-selective etching process.

Figure 6B:
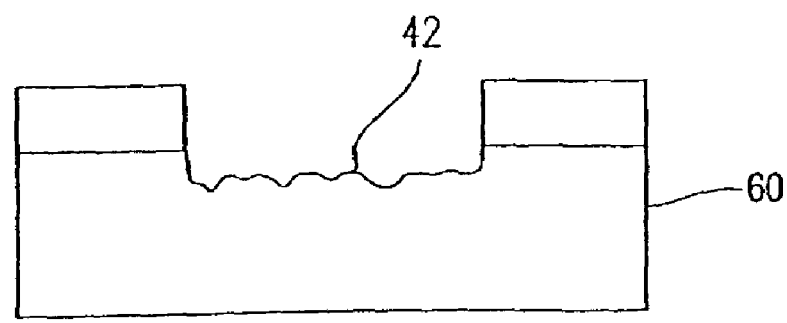

When the etching process is finished, the exposed portion of the sintered wafer 60 (i.e., the etched surface 42), which is not covered with the masking layer 51, has unevenness of a very small size on the bottom of the concave portion that is deeper than the non-etched surface as shown in FIG. 6B.

Figure 6C:
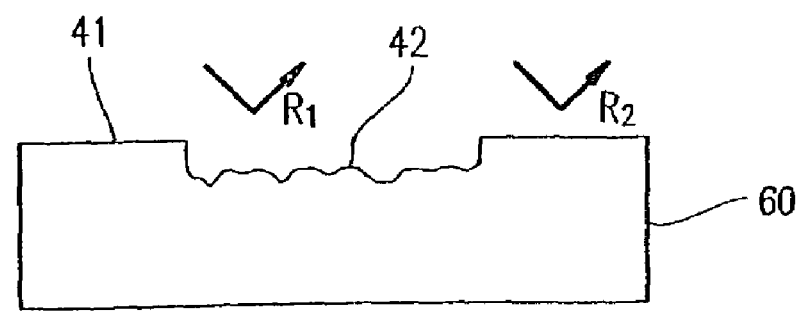
Figure 6D:
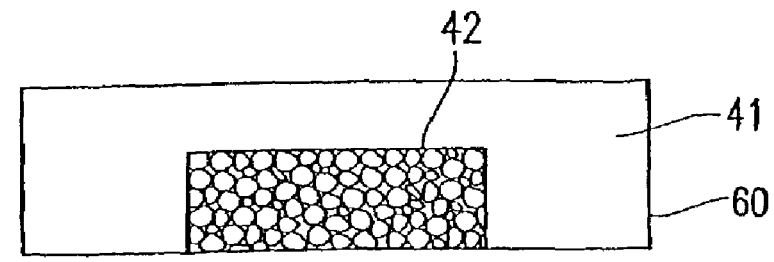
FIG. 6D is a plan view schematically illustrating the etched surface and non-etched surface of the ceramic wafer.

Next, as shown in FIG. 6C, the masking layer 51 is removed from the sintered wafer 60. The etched surface 42 with the unevenness of the very small size has a reflectance R1, which is lower than the reflectance R2 of the relatively flat non-etched surface 41 (i.e., R1<R2). FIG. 6D is a plan view schematically illustrating the unevenness of the etched surface 42.

The layout of the etched surface is defined by the planar pattern of the masking layer 51. The planar pattern of the masking layer 51, in turn, is arbitrarily defined by a photomask or a "Titler" marker for use in an exposure process. Thus, any desired ID information such as characters, signs or barcodes may be written on the sintered wafer 60.

To decrease the reflectance R1 of the etched surface 42, the line width of the characters, signs or barcodes is preferably sufficiently greater than the mean particle size of the particles that make up the sintered wafer 60.

The greater the variation $\Delta R=((R2-R1)/R2)$ in reflectance due to the etching process, the higher the contrast achieved by the light that has been radiated toward the surface of the sintered wafer 60. In the example illustrated in FIG. 6D, the etched surface 42 looks darker than the other portions, thereby accurately making the ID information, such as inscribed letters, highly recognizable.

According to the preferred embodiment of the present invention described above, the contrast can be increased by utilizing the fine unevenness on the bottom of a groove with an appropriate depth and the profile of the inscribed groove can also be increased. As a result, the ID information can be recognized at an increased rate.

The method of recording the ID information is not limited to the technique described above. Alternatively, a metal film may be deposited to a thickness of about 5 nm to about 500 nm on the surface of the wafer 60 and then patterned. In this manner, a pattern representing the ID information may also be made of such a patterned metal film, which may be made of Al, Cr, Si or an alloy thereof, for example, or other suitable material.

As another alternative, instead of recording the ID information on the surface of the wafer 60 by directly etching away the surface of the wafer 60 to define the embossed pattern, a thin film may be deposited on the surface of the wafer 60 and then a patterned metal film may be defined on the thin film.

Furthermore, it is also possible to define a concave region on the surface of the wafer 60 and then define a patterned metal film inside of that concave region.

It should be noted that the layer to be patterned to represent the ID information does not have to be a metal film but may also be a single or multiple layers that are made of any of various types of materials. In that case, an appropriate material needs to be selected with the type of the film to be deposited thereon and the conditions of subsequent processing steps taken into account.

The ID information does not have to be recorded on the surface of the wafer by forming those concave or convex portions thereon by the etching process or any other suitable technique. For example, the ID information may also be transferred onto the surface of the wafer by exposing the surface of the wafer (or a thin film deposited on the wafer), which is covered with a patterned photoresist layer, to an ion beam or any other suitable energy beam such that the exposed portions of the wafer or thin film are chemically modified. Some physical parameters of those exposed portions, including reflectance and conductivity, change through such surface modification. Thus, by detecting those changes, the ID information recorded thereon can be read accurately enough.

Optionally, an alignment mark may also be inscribed on the surface of the wafer by taking advantage of the processing step of recording the ID information. Such an alignment mark will be used to define the position of a photomask in a photolithographic process step to form the electrical/magnetic transducers and terminals.

Such an alignment mark may also be formed either on the surface of the wafer or on the thin film on the wafer while the ID information is being transferred thereto. Then, there is no need to perform the process step of forming the alignment mark separately and the number of required manufacturing processing steps can be reduced.

When the ID information is recorded (i.e., inscribed or transferred) on the surface of the wafer, an insulating film is preferably deposited to a thickness of about 0.5 µm to about 20 µm, for example, on that surface of the wafer. An optical ID information reader reads the ID information by irradiating reading light onto the substrate and detecting the light that has been reflected from the substrate. Thus, the insulating film needs to be made of a material that can transmit such reading light. The reading light normally has a wavelength of about 280 nm to about 1.6 µm. Accordingly, if the insulating film is made of a material that can transmit visible radiation, then the ID information can also be read with the eyes (e.g., with a microscope). Examples of preferred materials for such an insulating film include $Al_2O_3$ (alumina), AlN, $SiO_2$ and SiC. Among other things, alumina is particularly preferred. It should be noted that where the thin film described above is provided under the insulating film, the thin film does not have to transmit the reading light. Nevertheless, the thin film is also preferably made of the same material as the insulating film to be deposited thereon. The insulating film and the thin film may be deposited by a sputtering process, for example.

The concave and/or convex portions (i.e., the embossed pattern) representing the ID information are present under the insulating film (i.e., on the surface of the wafer or on the surface of the thin film on the wafer). Thus, the back surface of the insulating film also has a shape corresponding to the embossed pattern. However, the principal surface of the insulating film preferably has no such embossed patterns but is preferably planarized. This is because if the principal surface was uneven, particles might enter those concave portions to possibly create some harmful dust. The surface of the insulating film may be planarized by a polishing process, for example. The insulating film preferably has a surface roughness of at most about 2 nm.

In the preferred embodiment described above, the embossed pattern representing the ID information is coated with the insulating film. That is to say, the insulating film functions as a protective coating for the ID information recorded. Thus, it is possible to prevent the embossed pattern representing the ID information from being worn away or damaged badly during the manufacturing process of magnetic heads. In this manner, the ID information can maintain sufficient readability thanks to the presence of the insulating film.

In this manner, a thin-film magnetic head wafer according to a preferred embodiment of the present invention is completed. Thereafter, by performing the manufacturing processing steps of depositing and patterning various magnetic films on the principal surface of the wafer including the ID information thereon, various elements, interconnects and terminals are provided thereon to operate a magnetic head as intended.

Subsequently, if necessary, the back surface of the wafer is polished to reduce the thickness thereof. By performing this polishing process step, the thickness of the wafer can be reduced from about 1.2 mm (=1,200 µm) to any desired value of about 400 µm to about 800 µm, for example. Recently, as the sizes of magnetic heads have been further reduced, it has become more and more necessary to further reduce the thickness of magnetic head wafers (or substrates). For example, in a femto-slider, the substrate thereof should have a thickness of about 0.8 mm. However, if such a thin wafer is prepared on the first hand and then subjected to the manufacturing processing steps of depositing and patterning magnetic films, then the wafer will be warped too greatly to carry out the subsequent manufacturing processing steps (such as photolithographic and etching process steps) normally. For that reason, the back surface of the wafer is preferably polished after those elements, interconnects and terminals for magnetic heads, have been formed on the wafer. It should be noted that if the ID information was recorded on the back surface of the wafer as in the prior art, the ID information should be erased by polishing the back surface of the wafer. However, in various preferred embodiments of the present invention, no ID information is recorded on the back surface of the wafer. Thus, such a problem is avoidable.

Next, the wafer obtained in this manner is divided into multiple chip substrates for respective magnetic heads. If the ID information allocated to one location on a wafer is different from the ID information allocated to another location on the same wafer, then each of those magnetic head chip substrates, obtained by dividing such a wafer, will have its own identifier recorded thereon. In this manner, the respective magnetic heads are easily identifiable by their serial numbers. Thus, the magnetic head manufacturing process can be controlled as in the prior art.

In the preferred embodiment described above, the surface of the wafer on which the ID information has been recorded is coated with the insulating film. Thus, the particle or contamination problem, which is unavoidable when ID information is recorded on the back surface of the wafer, can be resolved. As a result, it is possible to provide a magnetic head that can be used effectively for a long time even in a recording medium drive that should be as free from dust as possible. Consequently, not only the production yield of magnetic heads but also the reliability of a magnetic recording and reproducing apparatus including such a magnetic head can be both increased.

Recording Medium Drive

Figure 7:
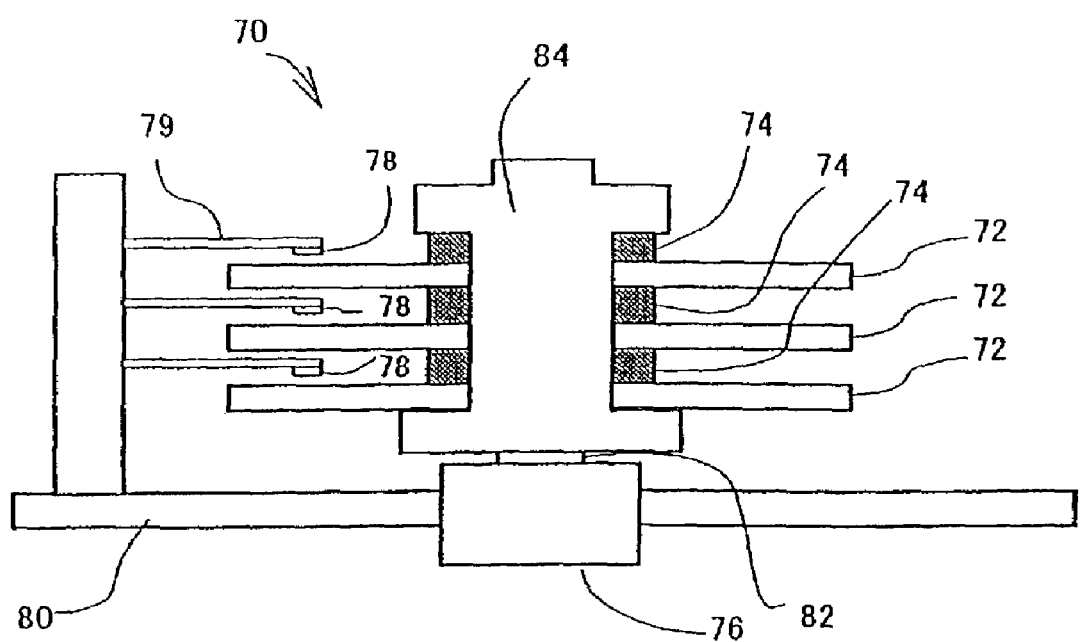
FIG. 7 is a cross-sectional view of a hard disk drive according to a preferred embodiment of the present invention.

FIG. 7 shows the cross-sectional structure of a recording medium drive (i.e., a hard disk drive) 70 including magnetic heads on which ID information is inscribed by the marking method according to the preferred embodiment of the present invention described above. As shown in FIG. 7, the hard disk drive 70 preferably includes three magnetic disks 72, each including a magnetic recording layer (not shown), media spacers 74 provided between the magnetic disks 72, an electric motor 76 for rotating the magnetic disks 72, and magnetic heads 78 for use to read and write information from/onto the magnetic disks 72 when brought close to the disks 72. The magnetic heads 78 are made by the method described above and each have inscribed ID information thereon. Each of these magnetic heads 78 is fixed to the end of its associated supporting member 79 and can gain access to any arbitrary track on its associated magnetic disk 72 rotating. Information can be read out from, or written on, the magnetic recording layer (not shown) of the magnetic disk 72 by an electrical/magnetic transducer (not shown) provided for the magnetic head 78. The electric motor 76 is secured to the chassis 80 of the hard disk drive 70. A rotating cylinder 84 is fitted with the rotating shaft 82 of the electric motor 76. The magnetic disks 72 rotate with the rotating cylinder 84.

Hereinafter, specific examples of preferred embodiments of the present invention will be described.

EXAMPLE 1

In a first specific example of a preferred embodiment of the present invention, an $Al_2O_3$—TiC based ceramic wafer, made of a compound sintered body including about 66 wt % of $Al_2O_3$ and about 34 wt % of TiC, was used. This wafer was obtained by a machining process as a substantially rectangular (of about 50 mm square) thin wafer with a thickness of about 1.2 mm. Also, the surface of the wafer was finished by a mirror polishing process using diamond slurry (with a mean particle size of about 1 μm) so as to have a surface roughness Ra of about 0.5 nm to about 1.5 nm.

In this specific example, a Cr film was deposited to a thickness of about 20 nm on the principal surface of the wafer by a sputtering process. Next, a resist pattern was defined on the Cr film by a photolithographic process and then the Cr film was patterned using the resist pattern as a mask, thereby recording ID information on the Cr film. Thereafter, the resist pattern was removed and then an insulating film of alumina, for example, was deposited to a thickness of about 3 μm on the principal surface of the wafer by a sputtering process. Subsequently, another alumina film was deposited as a protective coating to a thickness of about 25 μm on the insulating film.

EXAMPLE 2

In a second specific example of a preferred embodiment of the present invention, the same $Al_2O_3$—TiC based ceramic wafer as that of the first specific example described above was also used. A resist pattern was defined on the principal surface of the wafer. Next, using the resist pattern as an etching mask, the surface of the wafer was directly etched by a reactive ion etching (RIE) process, thereby recording ID information thereon. A groove was defined by the etching process to a depth of about 100 nm as measured from the surface of the wafer. Thereafter, the resist pattern was removed and then an insulating film of alumina, for example, was deposited to a thickness of about 3 μm on the principal surface of the wafer by a sputtering process. Subsequently, another alumina film was deposited as a protective coating to a thickness of about 25 μm on the insulating film.

COMPARATIVE EXAMPLE

As a comparative example to be compared with the first and second specific examples of preferred embodiments of the present invention, the same $Al_2O_3$—TiC based ceramic wafer as that of the first specific example described above was also used. In this comparative example, however, a resist pattern was formed on the back surface (i.e., the second principal surface) of the wafer. Next, using the resist pattern as an etching mask, the back surface of the wafer was directly etched by a reactive ion etching (RIE) process, thereby recording ID information thereon. A groove was formed by the etching process to a depth of about 100 nm as measured from the back surface of the wafer. Thereafter, the resist pattern was removed from the back surface of the wafer and then an insulating film of alumina, for example, was deposited to a thickness of about 3 μm on the surface (i.e., the first principal surface) of the wafer by a sputtering process. Subsequently, another alumina film was deposited as a protective coating to a thickness of about 25 μm on the insulating film. The insulating film and the protective coating (i.e., the first and second alumina films) were deposited on the surface (i.e., the first principal surface) of the wafer. Thus, the concave portions, which had been formed on the back surface of the wafer to record the ID information thereon, were covered with none of those alumina films but exposed to the air.

In the first and second specific examples and comparative example, each ID mark was inscribed as a string of seven alphanumeric characters (such as alphabets and numerals), and 3,000 ID marks (i.e., in 21,000 characters in total) were engraved on a single wafer. Each of those inscribed characters had dimensions of approximately 24 μm by approximately 12 μm.

Five sample wafers were prepared for each of the first and second specific examples and comparative example. Then, those fifteen wafers were immersed in water that filled fifteen different containers. Thereafter, the number of particles in the water was counted by a particle counter. The results are as follows:

Example 1: 2,125 particles per 100 cc;

Example 2: 2,368 particles per 100 cc; and

Comparative example: 4,897 particles per 100 cc As is clear from these results, a lot of particles were detected from the wafer of the comparative example, but the number of particles detected decreased significantly and the cleanness of the wafer increased remarkably in the first and second specific examples of preferred embodiments of the present invention.

The readability was measured with a reader that used light having a wavelength of about 546 nm as its illumination. Specifically, acuReader produced by Komatsu Ltd. was used as the reader. As a result, the present inventors confirmed that the ID information recorded on the wafer of the first or second specific example could be read almost as easily as the ID information recorded on the wafer of the comparative example.

Various preferred embodiments of the present invention described above provide a thin-film magnetic head wafer that includes ID information recorded on the principal surface thereof (i.e., on the trailing edge), not on the back surface thereof (i.e., on the leading edge). An insulating film of alumina, for example, is normally deposited on the trailing edge of the wafer. Thus, even without performing any additional manufacturing processing step, the embossed pattern representing the ID information is coated with that insulating film, thus increasing the cleanness of the wafer. In contrast, in a conventional example in which the ID information is recorded on the back surface of the wafer, an additional manufacturing processing step needs to be carried out to coat the ID information on the back surface of the wafer with an insulating film.

In addition, the embossed pattern representing the ID information is coated with the insulating film in a preferred embodiment of the present invention. Thus, the insulating film can function as a protective coating for the ID information recorded. Consequently, the embossed pattern representing the ID information will be neither worn out nor damaged during the manufacturing process of magnetic heads. As a result, the ID information once recorded can maintain sufficient readability.

Furthermore, since the ID information is recorded on the principal surface of the wafer, the thickness of the wafer may be reduced by polishing the back surface thereof.

Thus, according to preferred embodiments of the present invention, a magnetic head as a final product has a drastically decreased amount of dust, thus providing a recording medium drive with significantly increased reliability.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A thin-film magnetic head wafer comprising:

a first principal surface for supporting an electrical/magnetic transducer;

a second principal surface which is substantially parallel to the first principal surface; and an insulating film for separating the electrical/magnetic transducer from the first principal surface of the wafer, the insulating film covering the first principal surface of the wafer and having a flat surface; wherein identification information that is unique to the wafer is recorded on the first principal surface of the wafer; and the identification information is fully covered by the insulating film.

2. The wafer of claim 1, wherein the identification information is located on a plurality of areas on the first principal surface of the wafer, mutually different portions of the identification information being allocated to the respective areas.

3. The wafer of claim 2, wherein the areas are arranged so as to define respective thin-film magnetic heads when the wafer is divided.

4. The wafer of claim 1, wherein an alignment mark is formed on the wafer.

5. The wafer of claim 1, wherein the insulating film is made of alumina.

6. The wafer of claim 1, wherein the identification information is represented by at least one of a pattern of concave portions and a pattern of convex portions that have been arranged on the first principal surface of the wafer.

7. The wafer of claim 1, wherein the identification information is represented by a metal pattern that is provided on the first principal surface of the wafer.

8. The wafer of claim 1, wherein the wafer is made of alumina titanium carbide.

9. The wafer of claim 1, wherein the identification information is located in an area of the first principal surface such that light radiated toward the wafer to read the identification information is able to reach the area.

10. The wafer of claim 2, wherein each of the portions of the information allocated to the respective areas is recorded within a recording region that is included in a substantially rectangular area of about 300 µm square.

11. The wafer of claim 1, wherein the wafer has a thickness of about 400 µm to about 1,200 µm.

12. A magnetic head comprising:

a chip substrate comprising a divided portion of the thin-film magnetic head wafer of claim 1; and an electrical/magnetic transducer provided on the chip substrate.

13. A recording medium drive comprising:

a magnetic head including a chip substrate and an electrical/magnetic transducer, the chip substrate comprising a divided portion of the thin-film magnetic head wafer of claim 1, the electrical/magnetic transducer being provided on the chip substrate;

a recording medium with a magnetic recording film, from and on which information is read and written by the magnetic head; and a motor for driving the recording medium.

* * * * *